United States Patent
Kollmann et al.

(10) Patent No.: US 9,751,607 B1
(45) Date of Patent: Sep. 5, 2017

(54) METHOD AND SYSTEM FOR CONTROLLING ROTATABLE DEVICE ON MARINE VESSEL

(71) Applicant: Brunswick Corporation, Lake Forest, IL (US)

(72) Inventors: Troy Kollmann, Fond du Lac, WI (US); Mark W. Henker, Fond du Lac, WI (US); Yana V. Foltice, Campbellsport, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 14/858,844

(22) Filed: Sep. 18, 2015

(51) Int. Cl.
| | |
|---|---|
| *G05D 1/00* | (2006.01) |
| *B63H 25/02* | (2006.01) |
| *B63H 5/125* | (2006.01) |
| *G02B 27/01* | (2006.01) |
| *G06F 3/01* | (2006.01) |
| *G06F 3/041* | (2006.01) |
| *G06F 3/00* | (2006.01) |
| *G02B 27/00* | (2006.01) |

(52) U.S. Cl.
CPC ............ B63H 25/02 (2013.01); B63H 5/125 (2013.01); G02B 27/0093 (2013.01); G02B 27/017 (2013.01); G06F 3/002 (2013.01); G06F 3/012 (2013.01); G06F 3/041 (2013.01); B63H 2025/028 (2013.01)

(58) Field of Classification Search
CPC  G02B 7/005; G02B 2006/0098; G06T 3/005; G06T 7/0044
See application file for complete search history.

(56) References Cited

U.S. PATENT DOCUMENTS

| | | | |
|---|---|---|---|
| 3,337,845 A | 8/1967 | Hart | |
| 5,020,902 A | 6/1991 | Kits van Heyningen et al. | |
| 5,884,213 A | 3/1999 | Carlson | |
| 6,273,771 B1 | 8/2001 | Buckley et al. | |
| 6,885,919 B1 | 4/2005 | Wyant et al. | |
| 7,305,928 B2 | 12/2007 | Bradley et al. | |
| 8,050,630 B1 | 11/2011 | Arbuckle | |
| 8,417,399 B2 | 4/2013 | Arbuckle et al. | |
| 8,434,888 B2 * | 5/2013 | Jones ................. | A42B 3/044 |
| | | | 362/106 |
| 8,478,464 B2 | 7/2013 | Arbuckle et al. | |

(Continued)

FOREIGN PATENT DOCUMENTS

WO    2006/130882    12/2006

*Primary Examiner* — Jerrah Edwards
*Assistant Examiner* — Mathew F Gordon
(74) *Attorney, Agent, or Firm* — Andrus Intellectual Property Law, LLP (57) ABSTRACT

A control system of a marine vessel includes a vessel control unit that controls the rotational position of at least one rotatable device on the marine vessel, and a head-mounted display in data communication with the vessel control unit. The head-mounted display has a sensor system that detects a facing direction and a display positioned in the operator's field of view that displays an indicator of the facing direction. The head-mounted display also includes an interface element that allows the operator to select the facing direction. The control system operates such that the vessel control unit adjusts the rotational position of the rotatable device based on the facing direction.

20 Claims, 9 Drawing Sheets

(56) References Cited

U.S. PATENT DOCUMENTS

| | | | |
|---|---|---|---|
| 8,924,054 B1* | 12/2014 | Arbuckle | B63H 21/21 |
| | | | 701/21 |
| 8,952,869 B1 | 2/2015 | Weaver et al. | |
| 2002/0184640 A1* | 12/2002 | Schnee | H04N 7/181 |
| | | | 725/105 |
| 2007/0030211 A1 | 2/2007 | McGlone et al. | |
| 2010/0238161 A1 | 9/2010 | Varga et al. | |
| 2010/0240988 A1 | 9/2010 | Varga et al. | |
| 2012/0113274 A1 | 5/2012 | Adhikari et al. | |
| 2013/0044042 A1 | 2/2013 | Olsson et al. | |
| 2013/0162632 A1 | 6/2013 | Varga et al. | |
| 2013/0179116 A1 | 7/2013 | Rahman et al. | |
| 2013/0207887 A1 | 8/2013 | Raffle et al. | |
| 2014/0160165 A1 | 6/2014 | Kim et al. | |
| 2014/0240313 A1* | 8/2014 | Varga | G06T 19/006 |
| | | | 345/419 |
| 2015/0078140 A1 | 3/2015 | Riobo Aboy et al. | |
| 2015/0149111 A1 | 5/2015 | Kelly | |
| 2015/0193980 A1 | 7/2015 | Pedley et al. | |

* cited by examiner

METHOD AND SYSTEM FOR CONTROLLING ROTATABLE DEVICE ON MARINE VESSEL

BACKGROUND

U.S. Patent Publication No. 2012/0113274 is incorporated herein by reference in its entirety and discloses a system, method, and computer program product for automatically combining computer-generated imagery with real-world imagery in a portable electronic device by retrieving, manipulating, and sharing relevant stored videos, preferably in real time. A video is captured with a hand-held device and stored. Metadata including the camera's physical location and orientation is appended to a data stream, along with user input. The server analyzes the data stream and further annotates the metadata, producing a searchable library of videos and metadata. Later, when a camera user generates a new data stream, the linked server analyzes it, identifies relevant material from the library, retrieves the material and tagged information, adjusts it for proper orientation, then renders and superimposes it onto the current camera view so the user views an augmented reality.

U.S. Patent Publication No. 2007/0030211 is incorporated herein by reference in its entirety and discloses a data communication system for use on a surface or subsurface vessel. The system includes a base system and a plurality of user components. The base system includes a marine enhanced ground proximity warning system (MEGPWS), a communication component, and a wireless transceiver coupled to the MEGPWS. The user component includes a wireless transceiver, an earpiece speaker, a microphone, a heads-up display (HUD), and a processor coupled to the wireless transceiver, the earpiece speaker, the microphone, and the H-IUD. The processor generates an image for presentation on the HUD based on information received from the base system. Also, the processor receives voice signals from the microphone, prepares and transmits the received voice signals for transmission to the base system, receives voice signals from the base system via the wireless transceiver, and prepares and outputs the voice signals received from the base system via the earpiece speaker.

U.S. Patent Publication No. 2015/0078140 is incorporated herein by reference in its entirety and discloses a multi-function wearable apparatus comprising (a) a sensor module including a plurality of low power solid state kinematics sensors, (b) a microprocessor module comprising a low power microcontroller configured for device control, device status, and device communication; (c) a data storage module comprising a solid state local storage medium, said data storage module configured for sampling and storage of kinematics data; (d) a wireless communication module comprising a low power bidirectional transceiver wherein said wireless communication module is configured for communicating and synchronizing sampling time instances of said sensor module with signals from a second apparatus; and (e) a power module comprising a battery and an energy charging regulator. According to one embodiment, the wearable apparatus is a watch capable of quantifying human movement.

U.S. Patent Publication No. 2013/0044042 is incorporated herein by reference in its entirety and discloses an electronic device including a frame configured to be worn on the head of a user. The frame can include a bridge configured to be supported on the nose of the user and a brow portion coupled to and extending away from the bridge and configured to be positioned over a side of a brow of the user. The frame can further include an arm coupled to the brow portion and extending to a free end. The first arm can be positionable over a temple of the user with the free end disposed near an ear of the user. The device can also include a transparent display affixed to the frame adjacent the brow portion and an input affixed to the frame and configured for receiving from the user an input associated with a function. Information related to the function can be presentable on the display.

U.S. Patent Publication No. 2014/0240313 is incorporated herein by reference in its entirely and discloses a Heads-Up-Display ("HUD") system for projecting safety/mission critical data onto a display pair of light weight projection glasses or monocular creating a virtual 360 degree. The HUD system includes a see-through display surface, a workstation, application software, and inputs containing the safety/mission critical information (Current User Position, Total Collision Avoidance System—TCAS, Global Positioning System—GPS, Magnetic Resonance Imaging-MRI Images, CAT scan images. Weather data, Military troop data, real-time space type markings etc.). The workstation software processes the incoming safety/mission critical data and converts it into a three-dimensional stereographic space for the user to view. Selecting any of the images may display available information about the selected item or may enhance the image. Predicted position vectors may be displayed as well as three-dimensional terrain.

U.S. Pat. No. 8,952,869 is incorporated herein by reference in its entirety and discloses examples of methods and systems for determining correlated movements associated with movements caused by driving a vehicle. In an example, a computer-implemented method includes identifying a threshold number of sets of correlated movements. The method further includes determining that the threshold number of sets of correlated movements is associated with movements caused by driving a vehicle. The method still further includes causing the wearable computing system to select a driving user interface for the wearable computing system.

U.S. Patent Publication No. 2015/0193980 is incorporated herein by reference in its entirety and discloses two-dimensional or three-dimensional augmented reality (AR) markers for alignment with a target object in calibrating an optical see-through display, such as a head-mounted display (HMD), in an AR system. A calibrated projection matrix for calibration of the optical see-through display is computed based upon a user's repeated alignments of the AR markers with the target object.

SUMMARY

This summary is provided to introduce a selection of concepts that are further described herein below in the Detailed Description. This summary is not intended to identify key or essential features of the claimed subject matter, nor is it intended to be used as an aid in limiting the scope of the claimed subject matter.

In one embodiment, a control system of a marine vessel includes a vessel control unit that controls the rotational position of at least one rotatable device on the marine vessel, and a head-mounted display in data communication with the vessel control unit. The head-mounted display has a sensor system that detects a facing direction and a display positioned in the operator's field of view that displays an indicator of the facing direction. The head-mounted display also includes an interface element that allows the operator to select the facing direction. The control system operates such that the vessel control unit adjusts the rotational position of the rotatable device based on the facing direction.

One embodiment of a method of controlling a heading of a marine vessel includes automatically controlling the heading of the marine vessel with a vessel control unit. At a head-mounted display, a facing direction is detected using a sensor system, and then a facing direction indicator based on the facing direction is displayed on a display of the head-mounted display. The head-mounted display then receives an input to select the facing direction. The vessel control unit then adjusts the heading of the marine vessel based on the selected facing direction.

BRIEF DESCRIPTION OF THE DRAWINGS

The present disclosure is described with reference to the following Figures. The same numbers are used throughout the Figures to reference like features and like components.

DETAILED DESCRIPTION OF THE DRAWINGS

In the present disclosure, certain terms have been used for brevity, clarity, and understanding. No unnecessary limitations are to be inferred therefrom beyond the requirement of the prior art because such terms are used for descriptive purposes and are intended to be broadly construed.

Figure 1:
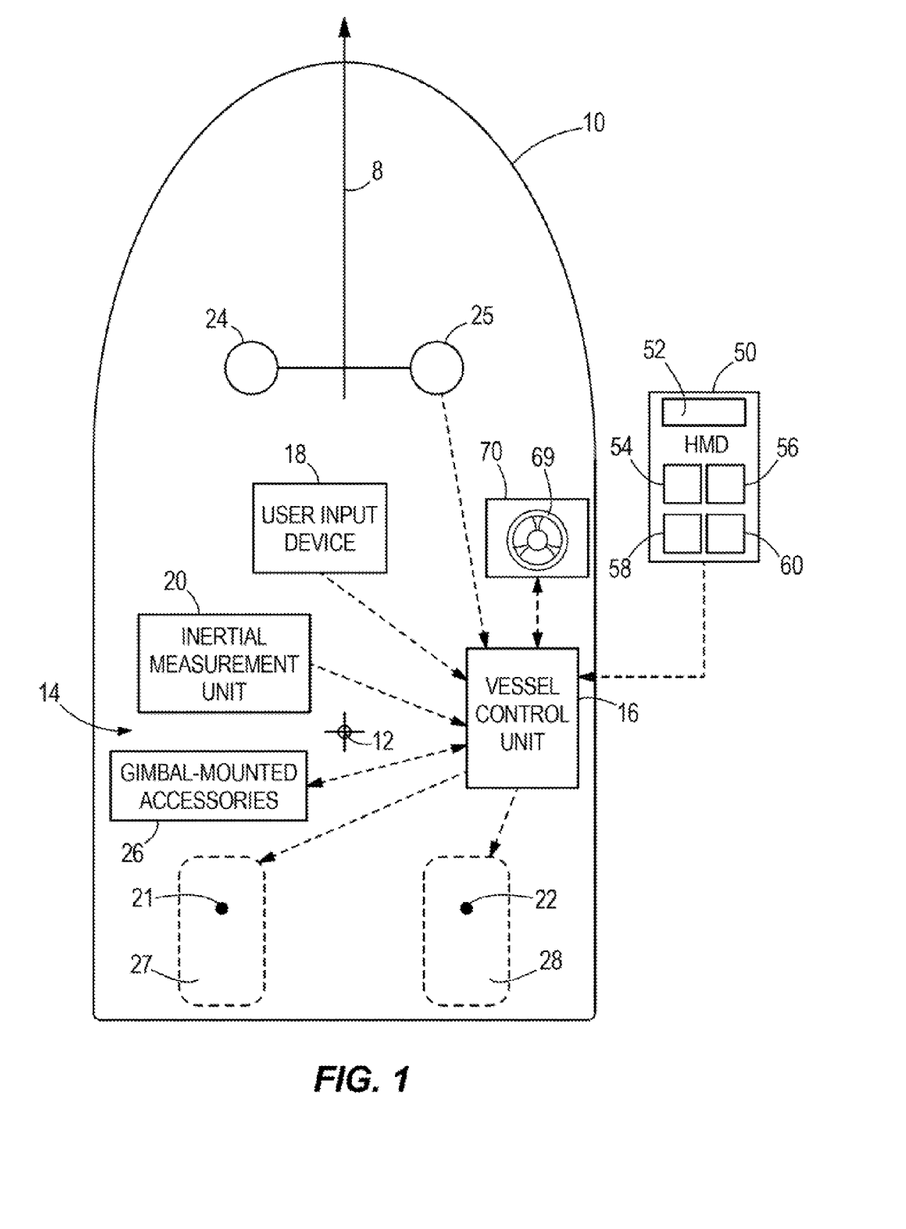
FIG. 1 is a schematic representation of a marine vessel equipped with a control system that includes a head-mounted display according to one embodiment of the present disclosure.

FIG. 1 schematically depicts an embodiment of a marine vessel 10 having a control system 14 including a head-mounted display (HMD) 50. As will be understood by one of ordinary skill in the art, a head-mounted display (HMD) is an electronic display device worn or mounted on the head of an operator, and is variously referred to by other phrases, including a wearable heads-up display, a wearable computing system, etc. The HMD 50 includes a mounting apparatus for mounting a display 52, sensor system 54, and an onboarding computing system 56 to the operator's head. Exemplary HMDs are provided and depicted at FIGS. 3 and 4. In various embodiments, the display 52 may be an opaque display appearing in a portion of the operator's field of view, or may be a transparent display that occupies some or all of the operator's field of view. The HMD may further include a touch input element 58 and/or a microphone 60.

The control system 14 also includes a vessel control unit 16 in data communication with the HMD 50. As described in detail herein, the HMD 50 communicates with the vessel control unit 16 to allow an operator to adjust the rotational position of a rotatable device associated with the marine vessel 10, such as a gimbal mounted accessory 26 and/or one or more propulsion devices 27, 28. It should be understood that the particular configuration of the marine vessel 10, and the control system 14 shown and described, provides one exemplary embodiment of the presently disclosed and claimed system and method. It is possible to apply the concepts described in the present disclosure with substantially different configurations for marine vessels and vessel control systems. For example, the marine vessel 10 depicted in FIG. 1 has first and second propulsion devices 27, 28. It should be understood that the concepts disclosed in the present disclosure are applicable to a marine vessel having any number of marine propulsion devices and any configuration of a propulsion device, such as a propeller, impeller, pod drive, and the like, which may be driven by any marine drive, such as an outboard motor, an inboard drive, or an inboard/outboard drive (or stern drive), as will be apparent to those of ordinary skill in the art. In addition, the control systems described herein include certain operational structures such as global positioning systems (GPS) 24, 25 devices and inertial measurement units (IMUs) 20. It should be understood that such systems may or may not be included in the vessel control system 14 disclosed herein, and that the concepts disclosed in the present disclosure are capable of being implemented with different input elements other than those described and depicted herein.

In FIG. 1, a marine vessel 10 having center of gravity along axis 12 is schematically illustrated. The marine vessel 10 has two marine drives 27 and 28, each having a steering axis, 21 and 22 respectively. The operation of the marine drives 27 and 28, including their rotation about steering axes 21 and 22, is controlled by the control system 14. The depicted control system 14 also includes a global positioning system (GPS) which, in the depicted embodiment, comprises a first GPS device 24 and a second GPS device 25 located at preselected fixed positions on the marine vessel 10 to provide information related to the global position of the marine vessel 10 in terms of latitude and longitude. The GPS system also includes an inertial measurement unit (IMU) 20. The IMU 20 can be, for example, part 8M0048162 available from Mercury Marine, of Fond du Lac, Wis. In certain embodiments, the IMU 20 may comprise a differential correction receiver, accelerometers, angular rate sensors, and a microprocessor which manipulates the information obtained from these devices to provide information relating to the current position of the marine vessel 10 in terms of longitude and latitude, the current heading of the marine vessel 10 (represented by arrow 8), and the velocity and acceleration of the marine vessel 10 in six degrees of freedom.

In the embodiment of FIG. 1, the control system 14 further includes a helm 70 providing an area where an operator can manually provide input to control various aspects of the marine vessel 10, and may include various input devices, such as a steering wheel 69, a joystick (not shown), and/or user input device 18. For example, the user input device 18 may enable an operator to provide input to control any one or more of the route, headings, control mode, propulsion speed, gear, direction, and/or the like. In exemplary embodiments, the user input device 18 may comprise one or more of a display screen, a touch screen, push buttons, a keyboard, or the like. Alternatively or additionally, the user input device 18 may further include remotely operated or wireless devices not physically installed on the marine vessel 10, such as a fob or other type of remote activator or controller.

The propulsion and steering control system 14 further includes a vessel control unit 16. The vessel control unit 16 includes a memory, a programmable processor, and programmable input/output peripherals. As is conventional, the processor can be communicatively connected to a computer readable medium that includes volatile and/or nonvolatile memory upon which computer readable code is stored. The processor can access the computer readable code, and the computer readable medium upon executing the code carries out functions as described herein below. The vessel control unit 16 is operatively connected to the various elements of the control system 14, including the GPS device(s) 24, 25, the IMU 20, the user input device(s) 18, the HMD 50, and the first and second marine drives 27 and 28. The vessel control unit 16 can receive inputs and send outputs via a CAN bus as described in U.S. Pat. No. 6,273,771 which is incorporated herein by reference in its entirety. In other examples, the vessel control unit 16 is connected to various portions of the control system 14, as well as other devices on the marine vessel 10, via wireless communication rather than by a wired CAN bus. Wireless communication between the vessel control unit 16 and other elements on the vessel, including the HMD 50, may be by any wireless means or standards, including Bluetooth, Wi-Fi, ZigBEE, or other communication protocol.

In one embodiment, the control unit 16 may receive information from a user input device 18 and/or the HMD 50 that the operator of the marine vessel 10 has selected a mode of operation, or a control mode. As an example, the user input device 18 may include an input screen or a set of push buttons that allows the operator to manually select various modes of operation associated with the marine vessel 10. As is provided herein, such operator input capabilities, including of selecting a control mode, may alternatively or additionally be integrated into the HMD 50. The user interface 18 and/or the HMD 50 may be used by an operator of the marine vessel to select a control mode and provide an enabling signal that informs the vessel control unit 16 that the operator desires to operate the marine vessel 10 in accordance with that control mode. Exemplary control modes may include a direction control mode that maintains or controls the heading of the marine vessel in accordance with an operator-selected heading (referred to herein as "heading mode"). Another exemplary control mode includes a route-planning mode that controls the heading and/or propulsion of the marine vessel 10 in order to execute an operator-selected route plan. Another exemplary control mode is station keeping mode that maintains the position of the marine vessel in a selected location, such as at a GPS location and at a particular heading. Such control modes are known in the art and examples are described in the prior art references, including at U.S. Pat. Nos. 8,417,399, 7,305,928, 8,050,630, 8,478,464, 8,924,054, 6,885,919, and 5,884,213, which are each hereby incorporated herein by reference in their entireties.

The HMD 50 and vessel control unit 16 may be configured to variously allow an operator to use the HMD 50 to send commands to any device or element on the marine vessel 10, or to adjust the station, heading, route, speed, or the like, depending on the selected control mode. For example, the HMD 50 and control unit 16 may operate differently to control the marine drives 27 and 28 in heading mode, than they would in other modes. In heading mode, the control unit 16 may control the marine drives 27 and 28 to automatically maintain a selected heading for the marine vessel 10. Such systems and arrangements are known in the art and examples are described in prior art references, including in those references listed and incorporated above.

The HMD 50 may also be configured to have a heading mode, whereby an operator can use the HMD 50 to adjust the heading 8 of the marine vessel 10. As exemplified in FIGS. 2A-2D and 5A-5C, the HMD 50 and/or the control unit 16 may be configured such that an operator wearing the HMD 50 can adjust the heading 8 by turning their head in the direction to which they desire to adjust the heading and providing an input command to select that direction. The input command may be provided by any interface element capable of receiving such command, such as via the user input device 18, a touch input element 58 on the HMD 50 or at the helm 70, a microphone 60 on the HMD 50 or at the helm 70 configured to receive voice commands from the operator, or the like. Likewise, in other modes, the HMD 50 may be configured to control the rotational position of one or more gimbal-mounted accessories 26 on the marine vessel, such as a camera or a search light mounted on a gimbal and thus rotatable in at least the yaw and pitch angular directions.

Figure 2A:
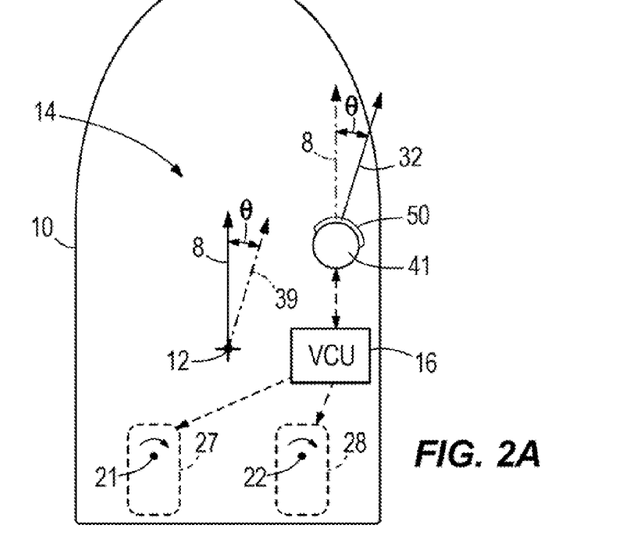
FIG. 2A illustrates one embodiment of a method and system for controlling heading of a marine vessel.
Figure 2B:
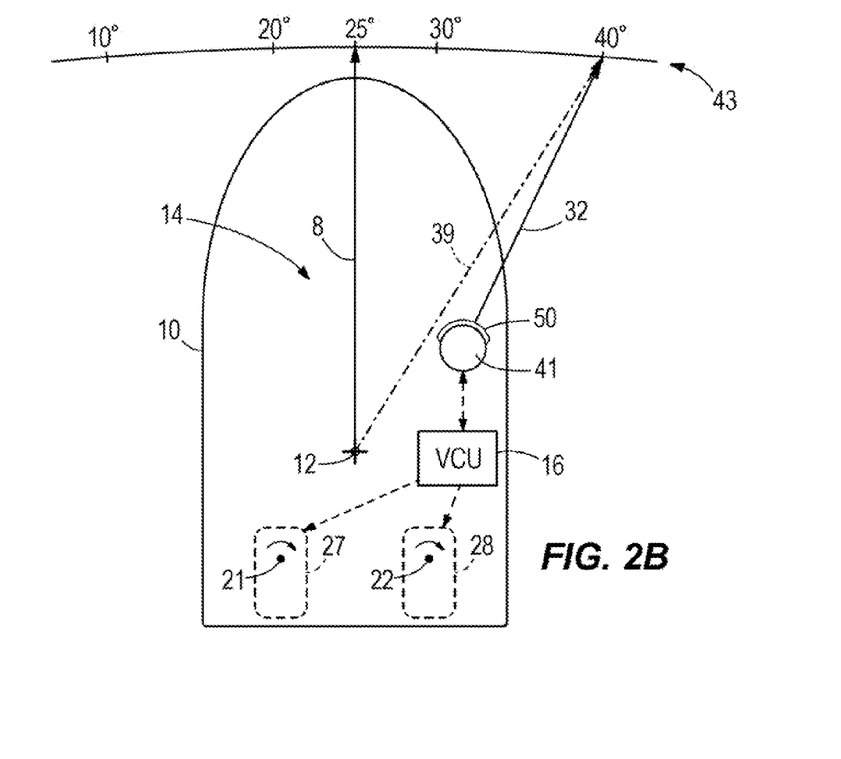
FIG. 2B illustrates another embodiment of a method and system for controlling heading of a marine vessel.

The HMD 50 comprises a sensor system 54 that detects the location, position, movement, etc. of the HMD 50, and thereby the movement of the operator's head wearing the HMD 50. The information from the sensor system 54 is utilized by the HMD 50 and/or the control unit 16 to control one or more rotatable devices, which may be executed in any of several different ways. FIGS. 2A and 2B schematically depict two exemplary methods by which the system 14 may operate to control the heading of a marine vessel. In the embodiments of 2A and 2B, the marine vessel 10 is headed towards heading 8, and the operator 41 uses the HMD 50 to adjust the heading 8 to an adjusted heading 39. The HMD 50 is worn by operator 41 and is in data communication with vessel control unit 16. The HMD 50 has a sensor system 54 (FIG. 3) that detects the direction that the operator 41 is facing, or the facing direction 32. An on-board computing system 56 of the head-mounted display 50, in one embodiment, determines the facing direction 32 as an angle with respect to north. For example, north may be true north or magnetic north, and may designate the zero point. The facing direction 32 is determined as an angle away from north in the clockwise direction, where east is 90 degrees, south is 180 degrees, and west is 270 degrees.

In the embodiment schematically depicted in FIG. 2A, the marine vessel 10 is initially heading toward heading 8. The HMD 50 determines the direction of the heading 8, either by receiving the heading 8 from the VCU 16 or by using its internal sensor system 54 to determine the heading. A person of ordinary skill in the art will understand that the wearable device 50 may use any combination of input from motion sensors, such as accelerometers, a magnetometer, and/or gyroscopes, and/or GPS tracking in order to determine a trajectory of motion that indicates the heading 8 of the marine vessel 10. For example, the HMD 50 may estimate the heading 8 with relative accuracy based on known past positions. The HMD 50 uses the sensor system 54 to determine a facing direction 32, which is presumably the direction that the operator 41 wearing the HMD 50 is looking. The operator 41 may select a particular facing direction 32, such as by touching a touch input element 58 on the HMD 50 or by providing a voice command received by the microphone 60 of the HMD 50.

In one embodiment, the HMD 50 receives the selection of a facing direction 32 and then calculates a difference θ between the selected facing direction 32 and the heading 8. In some embodiments, the HMD 50 may also continuously calculate the difference θ between the facing direction 32 and the heading 8, and may continuously display any or all of the facing direction 32, heading 8, and difference θ. The HMD 50 then transmits the facing direction 32 and/or the difference θ to the VCU 16. The VCU 16 then adjusts the rotational position of the propulsion devices 27 and 28 in order to adjust the heading 8 of the marine vessel 10 accordingly. In one embodiment, the VCU 16 rotates the marine drives 27 and 28 to adjust the heading by the difference θ in order to arrive at the adjusted heading 39.

In yet another embodiment, the HMD 50 transmits the facing direction 32 to the VCU 16 as an angle with respect to north, and the VCU rotates the propulsion devices 27 and 28 such that the adjusted heading 39 equals the facing direction 32. As will be understood by one of skill in the art, such an embodiment may be sufficient where the heading destination of the marine vessel 10 is sufficiently far away such that the location of the HMD 50 with respect to the center point of the vessel 12 is immaterial.

In the embodiment of FIG. 2B, the facing direction 32 may be calibrated to, or determined with respect to, a designated horizon 43, which may be a defined location on the vessel or a defined distance away from the marine vessel 10. For example, the designated horizon 43 may be a circular axis at a large defined distance, or radius, from a location on the vessel 10, such as the center of gravity 12 or the bow 11, such as a quarter mile, a mile, or more away. In another embodiment, such as that of FIG. 2C the designated horizon may be a circular horizon around the vessel at a shorter defined distance around a location on the vessel, which may exemplarily be on the order of tens or hundreds of feet from the center of gravity 12 or the location of the gimbal-mounted accessory 26.

This designated horizon 43 is used to triangulate, or translate, the facing direction 32 into an adjusted heading 39 for the marine vessel 10. In one such embodiment, the system 14 is designed for optimal operation when the operator 41 is at a predefined location on the marine vessel 10, such as at the helm 70. In another embodiment, the operator 41 could carry out a calibration exercise to calibrate the system 14 to a chosen location 97 on the marine vessel 10. As described below, FIGS. 2E and 2F demonstrate an exemplary calibration exercise, which could be performed at one or more chosen locations 97.

In the exemplary context of FIG. 2B, the heading 8 is 25 degrees from north on the designated horizon 43, and the selected facing direction 32 is 40 degrees from north on the designated horizon 43. The VCU 16 may then determine the adjusted heading 39 as the vector toward the 40 degree mark on the designated horizon 43. The VCU 16 then adjusts the propulsion units 27 and 28 by rotating them about their axes 21 and 22, respectively, in order to propel the marine vessel 10 towards the adjusted heading 39.

Figure 2C:
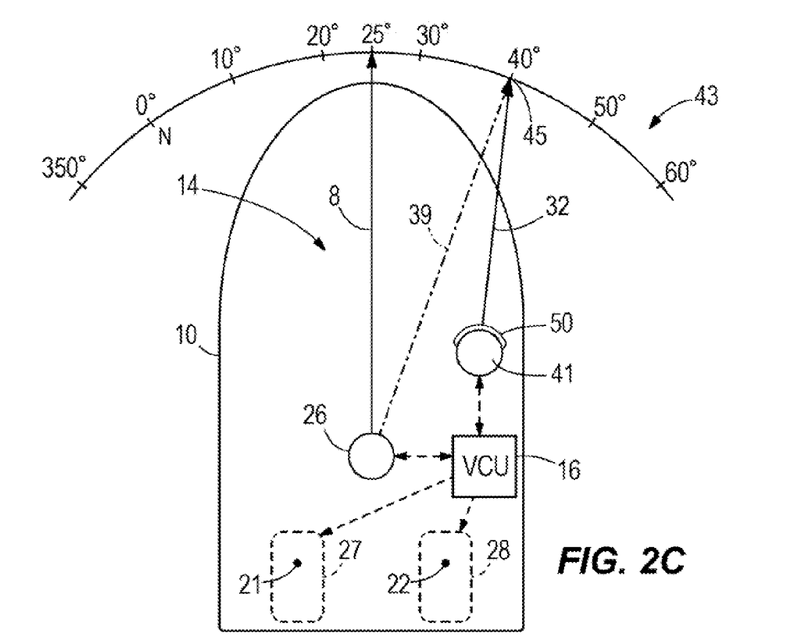
FIG. 2C illustrates one embodiment of a method and system for controlling a gimbal-mounted accessory.

A similar method is depicted in FIG. 2C, in which the system 14 is configured such that the HMD 50 is be used to control the rotational position of a gimbal-mounted accessory 26. The method shown and described in FIG. 2C may be especially appropriate for the application of controlling gimbal-mounted accessories 26 because it is better suited for near-field applications where increased precision is desirable. However, in contrast with the heading control method depicted and described with respect to FIG. 2B, which only involves controlling the yaw of the propulsion devices 27 and 28 (and thus the marine vessel 10), control of the gimbal-mounted accessory 26 may also include controlling the pitch of the accessory 26. Thus, the pitch of the operator's 41 head as they nod forward and back, for example, can be used to control the pitch of the gimbal-mounted accessory 26. Accordingly, the facing direction 32 may include the rotational position of the operator's 41 head in both the pitch and yaw angular directions.

The gimbal-mounted accessory 26 may be any device rotatably mounted on a gimbal. It is contemplated that the gimbal-mounted accessory 26 will be related to assisting an operator's vision, and thus would lend itself well to control based on the facing direction 32 of the HMD 50. In exemplary embodiments, the gimbal-mounted accessory 26 could be a search light or a camera, such as a thermal imaging camera or a video camera.

Referring to FIG. 2C, and adding to the description provided above with respect to FIG. 2B, the facing direction 32 may be determined with respect to a designated horizon 43, which may be relatively close to the vessel 10. Further, the facing direction 32 may be determined with respect to a designated vertical axis 105. Alternatively or additionally, the system 14 may be calibrated with respect to the waterline 45. The waterline would provide a likely intended heading location for gimbal-mounted accessories 26 such as searchlights and cameras, which are typically used by an operator to provide visual assistance or augmentation in the relative near-field and often close to the waterline. Accordingly, based also on the location of the operator 41 with respect to the gimbal-mounted accessory 26, an adjusted heading 39 for the gimbal-mounted accessory 26 may be calculated to direct the gimbal-mounted accessory 26 to the approximate location that the operator is facing. For example, the camera or search light can then be aimed at the location where the operator is facing, and presumably looking.

The adjusted heading 39 is determined based on the chosen location 97 of the HMD 50 relative to the gimbal-mounted accessory 26 (or the center axis 12 of the vessel 10), and where vectors extending from those elements intersect with the facing direction 32 with respect to the designated horizon 43, vertical axis 105, and/or waterline 45. One of skill in the art reading this disclosure will understand that various alignment calculation methods may be utilized to implement the results of the calibration exercise in order to calculate the corresponding adjusted heading 39 to the facing direction 32, including as described in U.S. Patent Publication No. 2015/0193980.

Figure 2D:
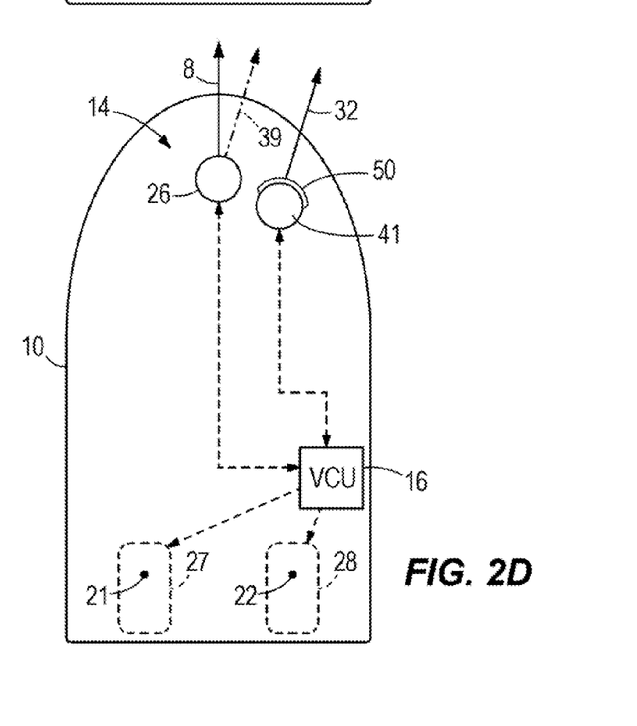
FIG. 2D illustrates another embodiment of a method and system for controlling a gimbal-mounted accessory.
Figure 2E:
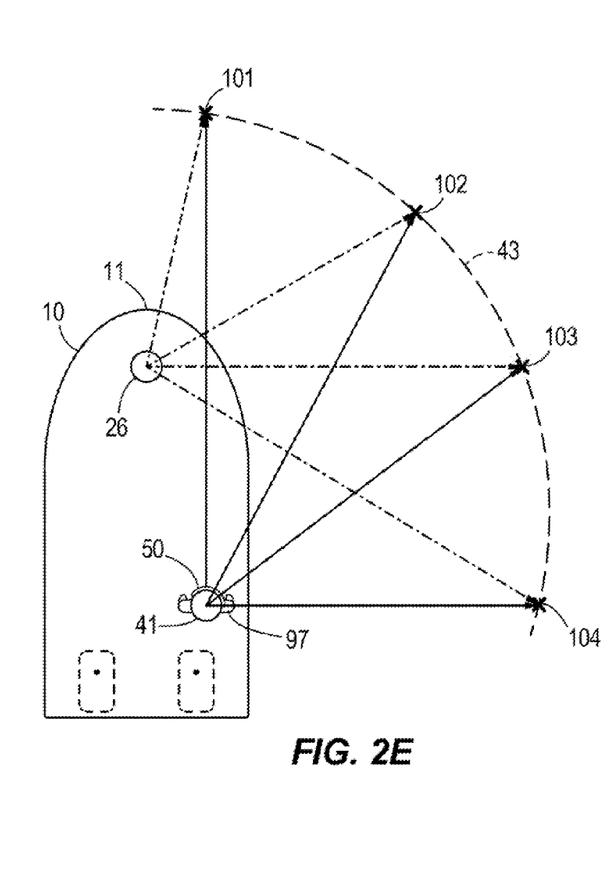
FIGS. 2E and 2F illustrate one embodiment of a calibration method for a method and system for controlling a rotatable device.
Figure 2F:
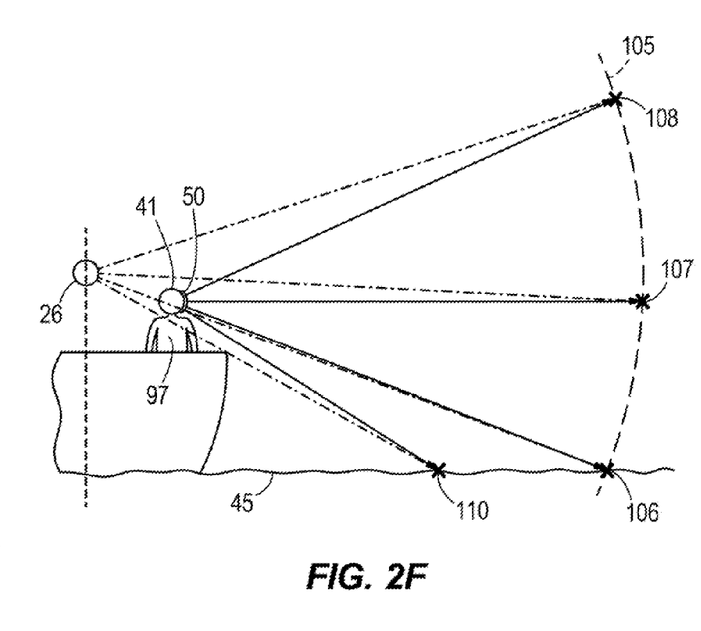

FIGS. 2E and 2F depict an exemplary calibration exercise that may be executed from a chosen location 97 on the vessel 10. The gimbal-mounted accessory 26 in the embodiment of FIGS. 2E and 2F is mounted on or near the bow 11 of the vessel 10. The gimbal-mounted accessory 26 highlights a series of positions, and the operator 41 then aims the HMD 50 at those positions. For example, where the gimbal-mounted accessory 26 is a search light, the search light may be aimed at the series of positions; where the gimbal-mounted accessory 26 is a camera, the camera may be equipped with a laser that projects a beam at the center of the camera's field of view. During a calibration exercise a target mark may appear in the display 52 of the HMD 50, and the operator may align that target mark with the positions highlighted by the gimbal-mounted accessory 26, such as at the center of the area lit by the search light or the laser beam.

Referring to FIG. 2E, the gimbal-mounted accessory 26 may be sequentially aimed at positions on the designated horizon 43, or yaw axis 101, 102, 103, 104. This may be carried out, for example, by shining the search light or the laser beam at the various positions 101, 102, 103, 104 on the water. The operator aims the HMD 50 at each position 101, 102, 103, and 104, as it is illuminated. These steps could be repeated for alignment in the vertical direction, by aiming both the gimbal-mounted accessory 26 and the HMD 50 at positions 106, 107, and 108 on a designated vertical axis 105, as depicted in FIG. 2F. Likewise, the system 14 could be further calibrated with respect to the waterline 45, by aiming both the gimbal-mounted accessory 26 and the HMD 50 at positions 106 and 110 on the waterline 45 that are at various distances from the vessel 10.

The system 14 may be configured such that the operator 41 provides input, such as at the touch pad 58 or verbally via the microphone 60, when the HMD 50 is aligned with the respective position. Further, the calibration exercise could be initiated, for example, by the operator providing a command to start a calibration exercise, such as via the user input device 18, the touchpad 58, a voice command to the microphone 60, etc. The calibration exercise could be repeated from multiple chosen locations 97 on the vessel 10, such as the helm 70, port, starboard, bow 1, stem, etc. In a further embodiment, either the HMD 50 or the VCU 16 may track the location of the HMD 50 with respect to one or more of chosen location(s) 97 or with respect to another location, such as the center axis 12 of the marine vessel 10 or the gimbal-mounted accessory 26. For example the sensor system 54 may track the movement of the operator 41 and calculate the operator's position with respect to one or more of the calibrated chosen locations 97. The system 10 then calculates the adjusted heading accordingly.

In another embodiment depicted in FIG. 2D, the system 14 may be configured such that the HMD 50 transmits the facing direction 32 based on input from the sensor system 54 to the VCU 16, and then the VCU 16 adjusts the rotational position of the gimbal-mounted accessory 26 such that the adjusted heading 39 is at the same pitch and yaw as the facing direction 32. Such an embodiment may be especially useful, and more accurate, where the operator 41 is very close to the location of the gimbal-mounted accessory 26 and/or where the focus distance—e.g., the location being recorded by the camera or illuminated by the search light—is sufficiently far away from the location of the operator 41 and the gimbal-mounted accessory 26.

Figure 3:
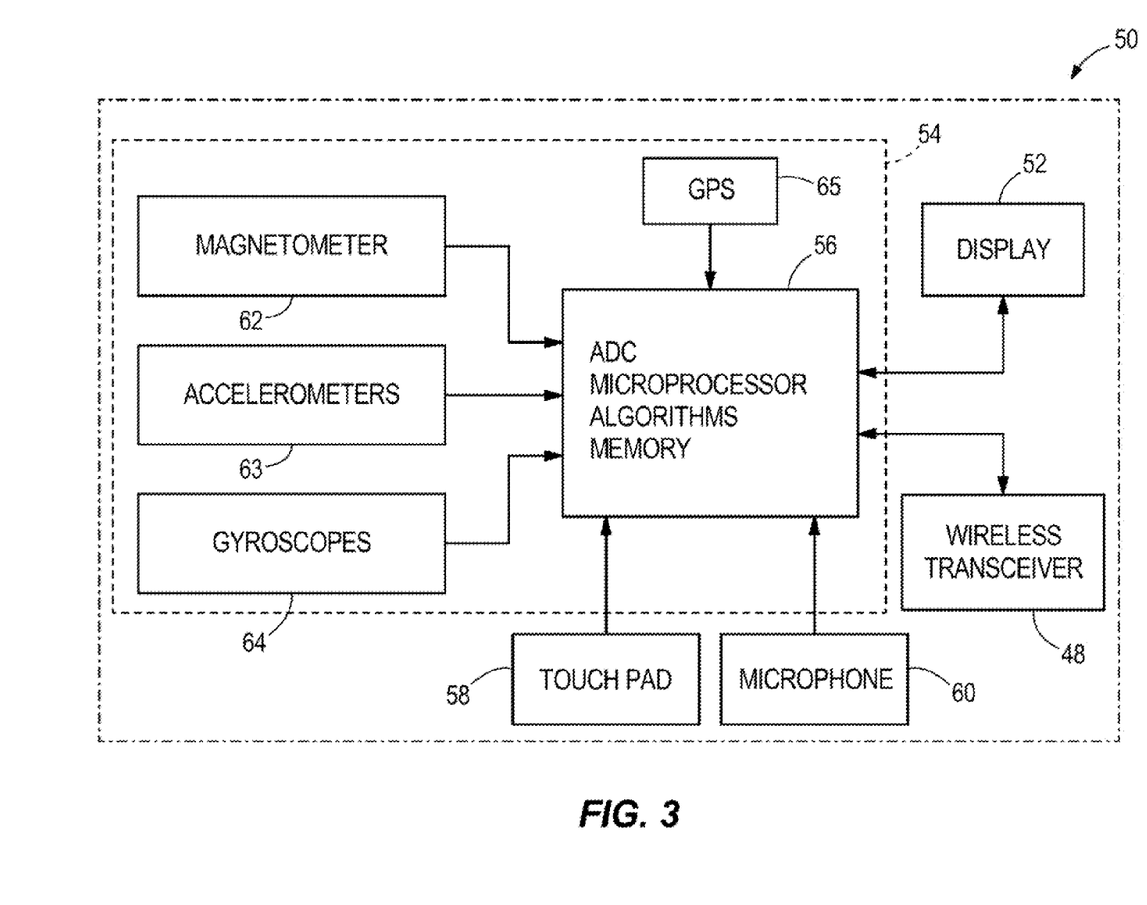
FIG. 3 is a schematic representation of one embodiment of a head-mounted display.

FIG. 3 provides a schematic diagram of an exemplary HMD 50. In accordance with the understanding of one of skill in the art, the HMD 50 may include a sensor system 54 having any of various combinations of sensors capable of sensing, or characterizing, the motion and position of the HMD 50 in the relevant spatial planes. In the embodiment of FIG. 3, the sensor system 54 may include one or more magnetometer 62, accelerometers 63, and gyroscopes 64. The magnetometer 62 and accelerometers 63 output 3-dimensional vector measurement data (e.g., on the x-axis, y-axis, and z-axis) in response to the accelerations and magnetic fields being experienced by the HMD 50. The gyroscope 64, or other rotation rate sensor, outputs angular change per unit time (e.g., degrees per second) about each of the three perpendicular axes. In other embodiments, the rotation rate of the HMD 50 may be determined solely by the accelerometers 63 and/or in conjunction with the magnetometers 62, such as in accordance with the description provided in prior an references incorporated herein, including U.S. Patent Publication No. 2015/0149111. The sensor system 54 may further include one or more GPS devices 65 to provide information related to the global position of the HMD 50. Alternatively, the HMD 50 could receive global positioning information from the VCU 16, based on the information provided by the GPS system 24 and 25 of the marine vessel 10.

The sensor system 54 further includes the on-board computing system 56, which receives motion data from the sensors and determines the facing direction 32 based thereon. The on-board computing system 56 may include analog-to-digital (ADC) peripheral inputs to receive and digitize the sensor data. The on-board computing system 56 further includes a micro processor module responsible for device control, device status, as well as data processing. The micro processor also executes algorithms, such as to calculate the facing direction 32 based on input from the sensor system 54. The on-board computing system 56 also includes memory, such as to store measurements from the sensor system 54, the status of the device, etc. The on-board computing system 56 may also receive input from the touch input element 58, such as a touch pad, microphone 60, and wireless transceiver 48, and provides output to control the wireless transceiver 48 and the display 52.

The HMD 50 may include any touch input element 58 that may be used by an operator to input commands, such as a touch pad or a button. In the embodiment of FIG. 3, the touch input element 58 is a touch pad that senses at least one of a position and a movement of a finger via capacitive sensing, resistance sensing, or a surface acoustic wave process, among other possibilities. The touch pad 58 may be capable of sensing finger movement in a direction parallel or planer to the pad surface, in a direction normal to the pad surface, or both, and may also be capable of sensing a level of pressure applied to the pad surface. One of ordinary skill in the art will understand that multiple such touchpad elements are known and appropriate for wearable device applications. The touchpad may be smooth with the exterior surface of the HMD 50, or may be formed to have a raised, indented, or roughened surface that provides textile feedback to the operator when the operator places a finger in the area of the touchpad 58.

The HMD 50 may further include a microphone 60 to sense voice commands from the operator 41. Such voice commands may be picked up by the microphone 60 and transmitted to the on-board computing system 56, which may be configured to detect particular voice commands and then trigger a pre-determined action or algorithm. For example, the HMD 50 may be configured to receive voice commands in order to engage certain modes, such as heading mode, or to execute certain actions within modes. For example, the HMD 50 may be configured to detect a pre-defined voice command to select a facing heading 32 within heading mode.

The HMD 50 may also include wireless transceiver 48. One of ordinary skill in the art will understand that a number of wireless transceivers may be appropriate for this application, such as any number of surface mount wireless transceivers using a small on-board antenna, such as a chip antenna, for both transmitting and receiving wireless communications. For example, the wireless transceiver 48 is configured to communicate wirelessly with the VCU 16 according to any number of protocols, as is described above.

Figure 4:
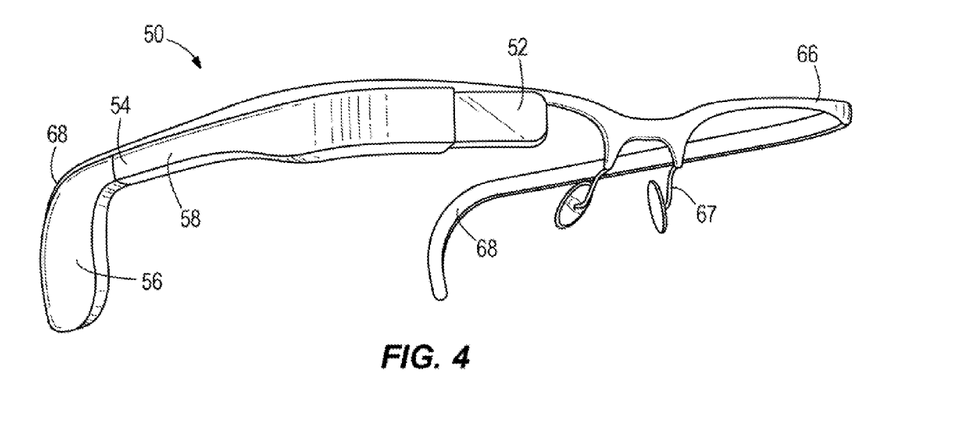
FIG. 4 depicts one embodiment of a head-mounted display.

The HMD 50 also includes a display 52. The display 52 is configured to provide computer-generated graphics within the operator's field of view. The display 52 may be any type of display that can be provided proximate to the operator's eye, or eyes, and capable of delivering an in-focus near-to-eye image to the operator 41 wearing the HMD 50. The display 52 may be, for example, an optical see-through display, a video see-through display, or an opaque see-around display. As depicted in FIG. 4, one exemplary HMD 50 may include a display 52 affixed to frame 66 so that the display 52 is supported by and positioned beneath the frame 66 at a location just below the operator's brow and in the top portion of the operator's field of view. In such an embodiment, the operator can comfortably observe their surroundings, and can direct their eyes up or down to view their surroundings in an ordinary fashion. Such an embodiment may be especially well-suited for boating applications, where the operator is ordinarily concerned with viewing objects on the horizon and below. For instance, the display unit 52 mounted just below the operator's brow will be visible when the operator is looking off at the horizon. However, in other embodiments the display 52 may be positioned at other locations, such as below the center of the operator's eye, which would also allow the image of the display device 52 to be out of the operator's direct field of view when looking at the horizon. In still other embodiments, the display 52 may be positioned directly in front of one or both of the operator's eyes. For example, the display 52 may comprise a clear or semi-opaque lens element positioned in front of one or both of the operator's eyes. The lens element may be configured, for example, to reflect a projected display onto the inside surface of the lens element. In another embodiment, the lens element may comprise an electroluminescent display or a liquid crystal display that overlays computer-generated elements into the operator's field of view. In still other embodiments, the lens element may include one or more wave guides for delivering an image to the operator's eyes. In still other embodiments, the display may be a prism projector, such as that described in prior art references including U.S. Patent Publication 2013/0044042 which is incorporated herein by reference.

Still referring to the exemplary embodiment of FIG. 4, the HMD 50 may have a frame 66 that mounts to the operator's head, such as by resting on the operator's ears via ear pieces 68 and on the operator's nose via nose pieces 67. The elements of the HMD 50, including the display 52, sensor system 54, on-board computing system 56, touch pad element 58, microphone 60, and others, may be mounted at various locations on the frame, such as is demonstrated in FIG. 4.

The control system 14 for the marine vessel described herein may incorporate any number of available devices as the HMD 50, and examples include, but are not limited to, Google Glass by Google, Inc. of Mountain View, Calif., any of the Smart Glasses line of products by Osterhout Design Group, Inc. of San Francisco, Calif., the Recon Jet Smart Eyewear product by Recon Instruments, Inc. of Vancouver, British Columbia, Canada, or the Moverio Smart Glasses product by Epson of Suwa, Japan.

Figure 5A:
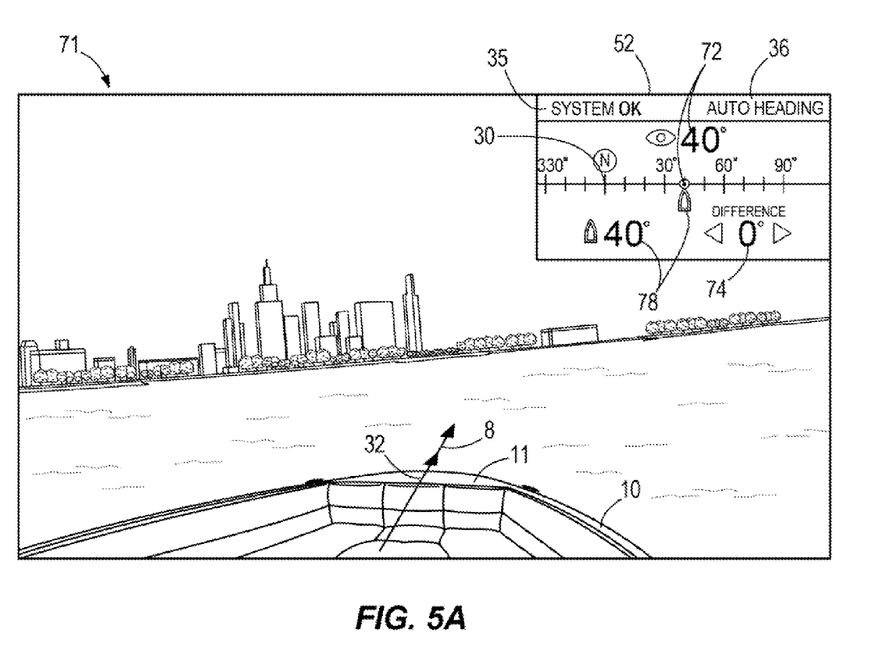
FIGS. 5A-5C depict embodiments and implementations of a method and system of controlling heading in accordance with the present disclosure.
Figure 5B:
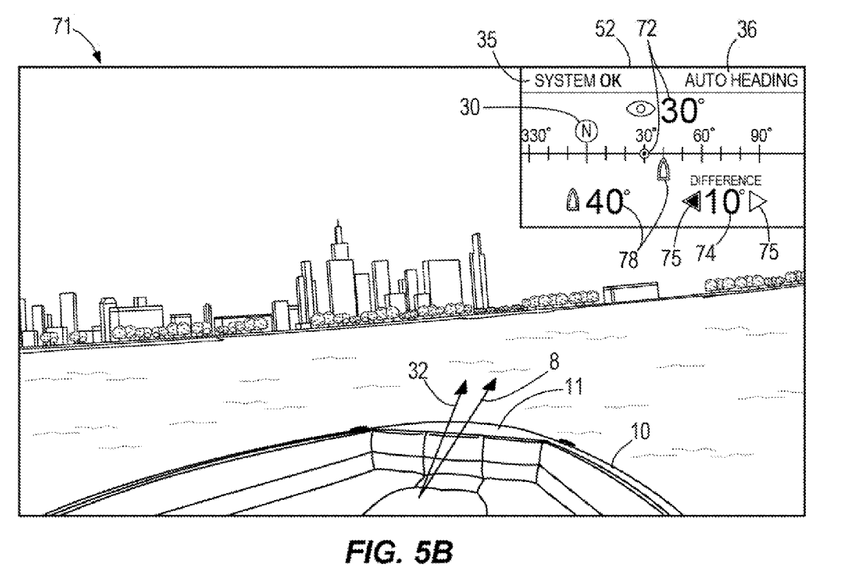
Figure 5C:
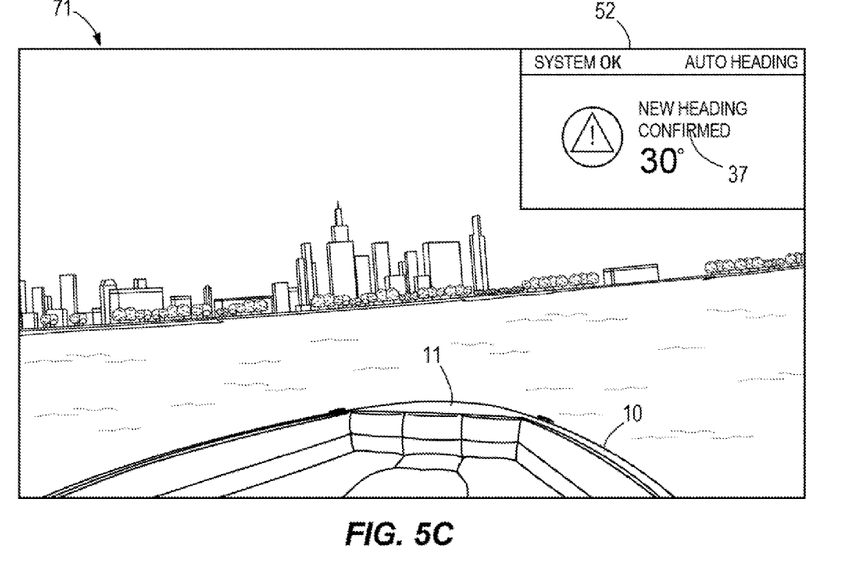

FIGS. 5A-5C provide an exemplary embodiment of a display 52 within an operator's field of view 71. In FIG. 5A, the operator is looking over the bow 11 of the marine vessel 10, and thus the facing direction 32 is equal to, or in the same direction as, the heading 8. Accordingly, the display 52 provides heading indicators 78 and facing indicators 72 that both indicate 40 degrees. Since the difference between the heading 8 and facing direction 32 is zero, the difference indicator 74 indicates that the difference θ is zero degrees. As depicted in the embodiment, the facing direction indicator 72 and or the heading indicator 78 may be presented as a numerical angle value with respect to north, where north is equal to zero degrees. Alternatively or additionally, the facing direction indicator 72 and the heading indicator 78 may be presented on a compass indicator 30, which graphically depicts the heading 8 and facing direction 32 with respect to north. In the depicted embodiment, the compass indicator 30 is a straight line with degree markers at regular intervals. In other embodiments, the compass indicator 30 may be circular, such as a depiction of a standard compass gage with markers indicating the facing direction 32 and the heading 8. The display 52 may further include a mode indicator 36, which may display the mode of the HMD 50 and/or the VCU 16. In the depicted example, the HMD 50 and VCU 16 are in an automatic heading control mode, which is depicted as "auto heading" in the mode indicator 36 of the display 52. The display 52 may further include a system status indicator 35, which may display, for example, any alerts generated by the VCU 16 and/or the HMD 50. In a depicted example, the system status indicator 35 indicates "system ok," communicating that there are no alerts with the system.

FIG. 5B depicts the same arrangement as FIG. 5A, except that the facing direction 32 is 10 degrees in the counter clockwise direction from the heading 8. Specifically, the heading 8 is at 40 degrees, as indicated by heading indicators 78, and the facing direction 32 is at 30 degrees, as indicated by the facing direction indicators 72. Accordingly, the difference indicator 74 indicates a 10 degree difference between the heading 8 and the facing direction 32. Additionally, a direction indicator 75 is highlighted on the left-hand side of the difference indicator 74 to indicate that the difference is in the counterclockwise direction. In this embodiment, the direction indicator 75 is presented as an arrow adjacent to the difference indicator 74 alternately highlighted in the left or right direction to indicate counterclockwise or clockwise, respectively. In other embodiments, the difference indicator 74 could be presented as a positive or negative number to indicate direction. Turning to FIG. 5C, the display 52 presents a receipt acknowledgment indicator 37 acknowledging receipt of a selected facing direction and the execution of the heading adjustment to align with the facing direction 32. In the presented scenario, the receipt acknowledgment indicator 37 acknowledges that the operator instructed a heading adjustment to 30 degrees from north.

Figure 6:
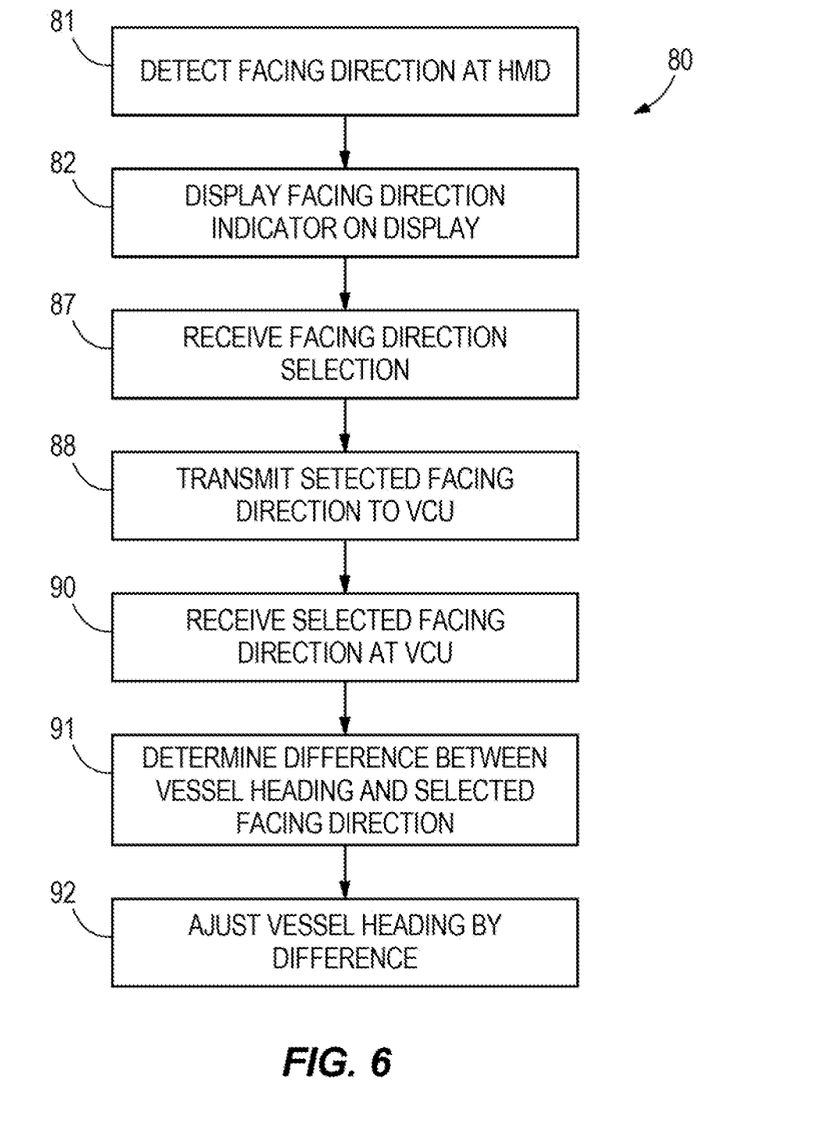
FIG. 6 illustrates one embodiment of a method of controlling heading of the marine vessel.

FIG. 6 depicts an embodiment of a method 80 of controlling a heading of a marine vessel. At step 81, a facing direction 32 is detected at a head mounted device 50. A facing direction indicator is then displayed on the display 52 at step 82. At step 87, a facing direction selection is received. The selected facing direction is then transmitted to the VCU 16 at step 88. At step 90, the selected facing direction is received at the VCU 16. The VCU then determines a difference θ between the vessel heading 8 and the selected facing direction 32 at step 91. The heading of the vessel is the adjusted by the difference θ at step 92 so that the vessel 10 heads toward the selected facing direction 32.

Figure 7:
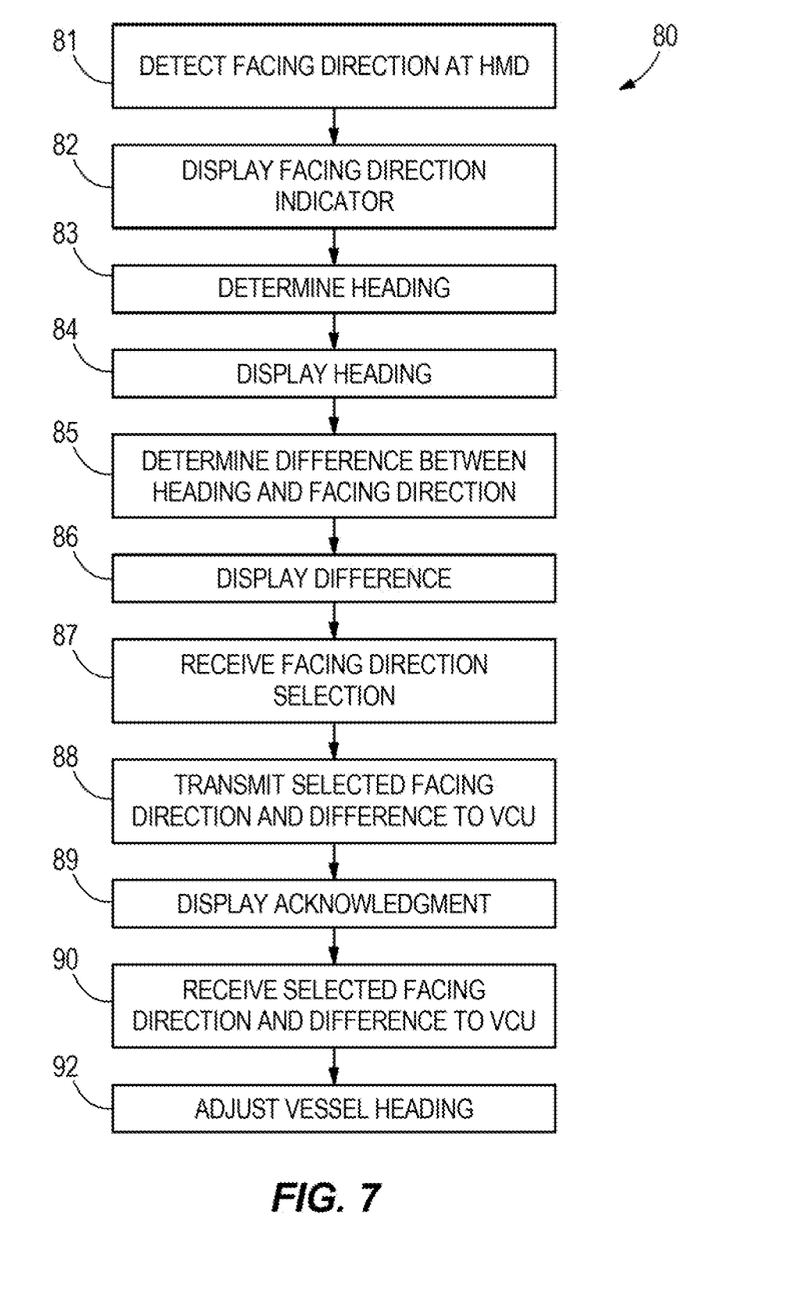
FIG. 7 depicts another embodiment of a method of controlling heading of a marine vessel.

FIG. 7 depicts another embodiment of a method 8 of controlling heading. The facing direction 32 is detected at the HMD 50 at step 81. At step 82, a facing direction indicator 72 is displayed on the display 52. A heading 8 is then determined at step 83, and the heading 8 is displayed on the display 52 at step 84. A difference between the heading 8 and the facing direction 32 is determined at step 85. The difference is then displayed on the display 52 at step 86. At step 87, the HMD 50 receives a facing direction selection. The selected facing direction 32 and the difference θ are transmitted to the VCU 16 at step 88. At step 89, an acknowledgement is displayed on display 52 to acknowledge receipt of the facing direction selection. The selected facing direction 32 and difference θ are received at the VCU 16 at step 90. Then, at step 92, the VCU 16 adjusts the vessel heading by rotating the one or more propulsion devices 27, 28 attached thereto.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies described herein may be used alone or in combination with other assemblies. It is to be expected that various equivalents, alternatives and modifications are possible within the scope of the appended claims.

What is claimed is:

1. A control system of a marine vessel, the system comprising:
    a vessel control unit that controls a rotational position of at least one propulsion device that propels a marine vessel toward a heading;
    a head-mounted display in data communication with the vessel control unit, the head-mounted display having:
        a sensor system that detects a facing direction based on an orientation of the head-mounted display;
        a display positioned in an operator's field of view that displays an indicator of the facing direction; and
        an interface element that receives input from the operator to select the facing direction;
        generates a selected facing direction based on the input; and
    wherein the vessel control unit adjusts the rotational position of the propulsion device based on the selected facing direction.

2. The system of claim 1, wherein the head-mounted display further determines a difference between the heading and the selected facing direction, and transmits the difference to the vessel control unit; and
    wherein the vessel control unit adjusts the heading of the marine vessel by the difference.

3. The system of claim 2, wherein the head-mounted display receives the heading from the vessel control unit.

4. The system of claim 2, wherein the sensor system of the head-mounted display determines the heading.

5. The system of claim 1, wherein the head-mounted display transmits the selected facing direction to the vessel control unit; and
    wherein the vessel control unit adjusts the heading of the marine vessel to the selected facing direction.

6. The system of claim 1, wherein the interface element is a touch input element on the head-mounted display.

7. The system of claim 6, wherein the head-mounted display displays a receipt acknowledgment of the selected facing direction.

8. The system of claim 1, wherein the interface element is a microphone on the head-mounted display to receive voice commands from the operator to select the facing direction.

9. The system of claim 1, wherein the interface element is a touch input element on a helm of a marine vessel.

10. The system of claim 1, wherein the facing direction is determined with respect to a designated horizon that correlates to the heading.

11. The system of claim 1, wherein the facing direction is determined with respect to a predefined location of the head mounted display on the marine vessel.

12. A method of controlling heading of a marine vessel, the method comprising:
    automatically controlling the heading of the marine vessel with a vessel control unit;
    at a head-mounted display:
        detecting a facing direction using a sensor system;
        displaying a facing direction indicator based on the facing direction on a display of the head-mounted display; and
        receiving an input to select the facing direction;
        calculating a difference between the heading and the selected facing direction; and
    adjusting the heading of the marine vessel with the vessel control unit based on the selected facing direction.

13. The method of claim 12, further comprising calculating a heading based on motion data detected with the sensor system.

14. The method of claim 13, wherein the step of calculating a difference between the heading of the marine vessel and the selected facing direction is performed by the head-mounted display; and
    further comprising transmitting the difference from the head-mounted display to the vessel control unit.

15. The method of claim 13, wherein the vessel control unit adjusts the heading of the marine vessel by the difference.

16. The method of claim 14, further comprising displaying the heading and the facing direction on the display.

17. The method of claim 16, further comprising displaying a receipt confirmation of the selected facing direction.

18. The method of claim 12, further comprising transmitting the selected facing direction from the head-mounted display to the vessel control unit; and
    adjusting the heading of the marine vessel with the vessel control unit to the selected facing direction.

19. The method of claim 12, further comprising:
    determining a predefined location of the head-mounted display with respect to the marine vessel; and
    calibrating the head-mounted display to determine the facing direction based on the predefined location.

20. The method of claim 12, wherein the facing direction is determined with respect to a designated horizon that correlates to the heading.

* * * * *